(12) United States Patent
Eldridge et al.

(10) Patent No.: US 6,977,741 B2
(45) Date of Patent: Dec. 20, 2005

(54) PROGRESSIVE IMAGE SHIFT FOR A SADDLE-STITCHED DOCUMENT

(75) Inventors: George L. Eldridge, Long Beach, CA (US); Mark A. Smith, Rochester, NY (US); San A. Phong, Cerritos, CA (US); Farzin Blurfrushan, Redondo Beach, CA (US); Hilda Gharabegian, Rancho Palos Verdes, CA (US); Peter A. Crean, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 959 days.

(21) Appl. No.: 09/745,925

(22) Filed: Dec. 21, 2000

(65) Prior Publication Data

US 2002/0080371 A1     Jun. 27, 2002

(51) Int. Cl.[7] .......................... G06F 15/00; B41J 2/435
(52) U.S. Cl. ...................... 358/1.15; 347/247; 715/517
(58) Field of Search .............................. 358/1.15, 1.16, 358/1.17; 399/82; 347/247; 235/375; 715/517, 715/513

(56) References Cited

U.S. PATENT DOCUMENTS

| | | | | |
|---|---|---|---|---|
| 5,611,024 A | * | 3/1997 | Campbell et al. | 358/1.15 |
| 5,701,151 A | * | 12/1997 | Plakosh | 347/247 |
| 6,681,085 B1 | * | 1/2004 | Collard et al. | 399/82 |

* cited by examiner

Primary Examiner—Kimberly Williams
Assistant Examiner—Saeid Ebrahimi-Dehkordy
(74) Attorney, Agent, or Firm—Jeanette Walder

(57) ABSTRACT

Shifting a page image while it is still in compressed form. The page image is compressed into independent strips that are a full page in the fast scan direction, and a small number of scanlines in the slow scan direction. Then, to shift the page image, whole strips can be deleted in one margin and/or deleted from the other. If the number of scanlines per strip is small enough, the difference in a margin created by the change of one strip will not be apparent. This invention can be used to advantage when it is decided at print time that the output shall be in the form of a saddle-stitched booklet requiring two-up printing, folding and subsequent trimming of the outside edges to uniform alignment. Here, a progressive page shift can be introduced at the printer controller while the images are still compressed, instead of requiring the change to be done to the PostScript Master, which would require reRIPing or decompression, shift and recompression.

1 Claim, 1 Drawing Sheet

PROGRESSIVE IMAGE SHIFT FOR A SADDLE-STITCHED DOCUMENT

BACKGROUND OF THE INVENTION

A method of varying the size of a vertical margin while the page image is still in compressed form by compressing the page data into narrow vertical bands, and either deleting or adding bands to vary the margin.

Compression and decompression are normally done line-by-line in the fast scan direction across an entire page. In the past, one problem with this approach was that if an error occurred somewhere in the page, the entire page would have to be recompressed. To save time, the page would be separated into independent bands that were compressed separately. At the end of each band, a check sum, or some other kind of error checking could be used, so that if an error occurred, only the band with the problem would have to be redone. Other reasons to divide a page into compressed bands was to use less memory, or to time multiplex a number of separations to the different channels of a color printer.

In the printing industry it is sometimes required to print a document in the form of a saddle-stitched booklet. To describe this in the form of a numerical example, assume that sheets of paper that are approximately 17 by 11 inches are used to form a booklet that is folded in the middle and stitched at the fold to produce a booklet that is approximately 8½ by 11 inches. Two or four 8½ by 11 inch page images are combined on the 17 by 11 inch paper. In this case, the central sheets would protrude further than the outside sheets, so the last step is to trim the outside edge of the booklet to make all pages even. But all page images should have an equal margin to the outside edge of the page, requiring that each page image, from the front of the booklet to the middle, for example, must be moved further toward the center than the previous one on each 17 by 11 sheet during printing.

Usually the decision is made to print a center-folded booklet early in the printing process when the pages are still in PostScript form. It is easy to adjust the margins prior to RIPing (converting PostScript image data to a raster). However, if the decision is made after RIPing, then the document must be RIPed again with the new parameters or it must be decompressed from its final form, the margins adjusted, then recompressed. These operations are all time consuming. A saving in time can be achieved if the shift can be accomplished without reRIPing and without a decompression and recompression cycle.

SUMMARY OF THE INVENTION

In this invention, the page image is compressed into narrow vertical bands, each of which contains a suitably small number of scan lines. Then, to shift an entire page horizontally, the proper number of bands may be added to one side and subtracted from the other while the data is still in compressed form. Adding a band may require only the addition of an encoded word signifying an all-white band at one margin, while deleting a band simply requires the deletion of a band at the other margin. Thus, both are simply performed.

Of course, the bands must be in the vertical direction, and must be small enough so that the change of one band does not make a visible difference. For a numerical example, a band that is 8 lines wide, in a 600 line per inch printer, would amount to 0.013 of an inch, below what is visibly detectable by the naked eye.

An example of the coding that could be used for this invention would be run length encoding. An example would be a code that names the color of the first pixel in a scan line and the length in pixels, and thereafter describes the color and length of each run. Thus a scan line that starts with one white pixel, two black pixels and three white pixels would be "1W, 2B, 3W . . . " Using this system, an added white band of 8 lines at 600 pixels per inch and 8½ inches long to shift the image by 0.013 of an inch would be simply "5100W, 5100W, 5100W, 5100W, 5100W, 5100W, 5100W".

The result is that the page image can be shifted right or left while still in the compressed form. The use of a band-offset table facilitates adding or deleting bands. The band-offset table is a list of the starting location of each band in the entire page image.

DETAILED DESCRIPTION OF THE INVENTION

Figure 1:
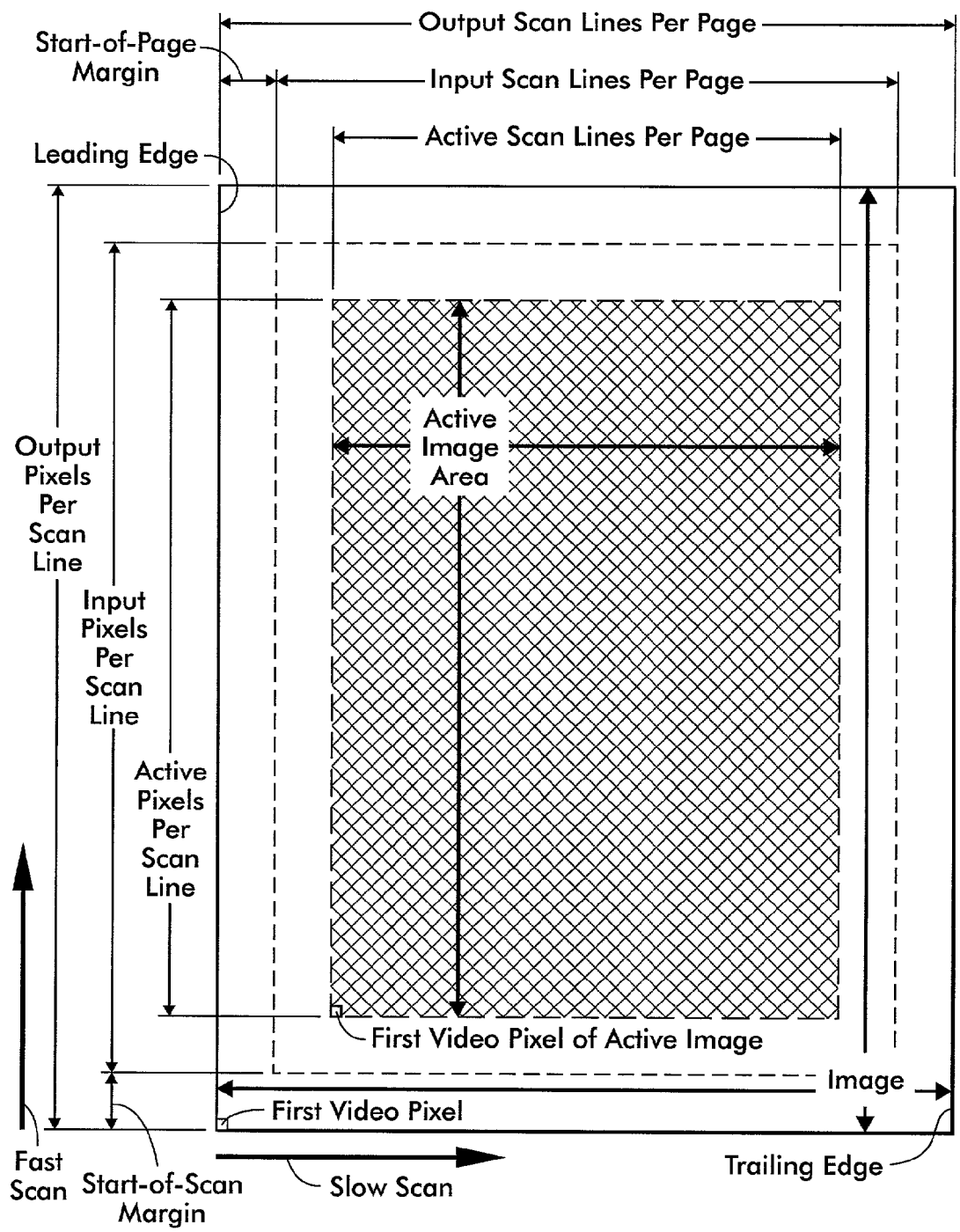
FIG. 1 shows the generalized relationships when viewing the imaged side of the paper.

The disclosed embodiment is an application of image shift hardware which is implemented in an image handling module of the printer controller, and supports positive and negative shifts in the slow scan direction to the image data while it is still in compressed form. This feature can be used for progressive image shift where each page in the job is shifted by a different amount. This progressive shift, for example, can be used for making saddle-stitched booklets when printing two-up or four-up page images. In such a booklet the gutter (margin) for each page is different from the previous, as is necessary for the pages to align at the outer edge of the booklet after trimming.

This system has the ability to combine page images in real time during printing to produce saddle-stitched booklets. ReRIPing is not required, even though the document was not RIPed for saddle-stitched printing, as is the usual case. This is because, in the normal case, the pages exist in compressed form, and a margin change that requires the addition or deletion of scanlines would require decompression before the change and compression after. The point of this invention is to build the margin change capability into the printer controller hardware. Then, in real time, when the pages are being delivered to the printer, and while they are still compressed, the margins can be altered.

This process is made possible by using a compression algorithm which independently compresses 8-line strips of the page. Then, at any later time in the process while the data is still compressed, shift in the slow scan direction can be done by skipping strips or adding strips.

Adding a second page image for two-up printing in the slow scan direction is done by concatenating the strips of the second page image after the first page. The addition of gutter between page images is done by inserting blank strips between the first and second page images. The shifting is performed as part of the pixel output operation and takes no additional time. Shift and gutter can be changed for each output page.

This process supports a shift function to allow page images of a document that was previously RIPed and compressed for simplex or standard duplex printing, to be printed and shifted in real-time without reRIPing and re-compressing the job. This process supports positive and negative shifting in the slow scan direction in one-band resolution. The shift function is set by programming registers in the printer controller. The shift can be changed on a separation-by-separation basis for different shift requirements between pages. For image data that is shifted off the page, this process expects software to trim off-the-page strips and not send them to the printer. Only the strip that straddles the leading or trailing edge of the page is sent.

Image shift in the fast scan direction can be included to adjust the placement of the image on the paper in fast scan direction. The shift function is performed by adding or deleting pixels from each scan line. This shift function is set by programming registers in the decompression hardware in the printer controller.

The following describes the image convention and shift/clip operations in positive and negative directions.

Image Convention

The image on paper is described with respect to the following spatial imaging conventions, which must be followed by all the PEs (Print Engine). The image is a rectangular image space whose sides are parallel to the slow scan and fast scan directions of the PE. FIG. 1 shows the generalized relationships when viewing the imaged side of the paper. The first pixel delivered to the image frame is located at the lower left hand corner, as viewed from the start-of-scan edge; the fast scan and slow scan proceed upward and to the right, respectively.

Active image data is the image information that is intended to appear on the paper. It is the responsibility of the printer controller hardware to align the page image data within the image frame so that it is imaged on the paper.

The following parameters are needed to perform image shift operations:

1. Output pixels per scanline (OPPS): this is the total number of pixels supplied to the PE in the fast scan direction. This number includes both margin pixels and active pixels. The resolution of OPPS is on a pixel basis.

2. Output scanlines per page (OSPP): this is the total number of scanlines supplied to the PE in the slow scan direction. This number includes both margin scanlines and active scanlines. The resolution of OSPP is on a scanline basis.

3. Input pixels per scanline (IPPS): this is the number of pixels supplied in the fast scan direction. An ASIC reads in pixels per scanline from decompressor chips according to this parameter. The resolution of IPPS is on an 8-pixel basis due to the requirement of JPEG.

4. Input scanlines per page (ISPP): this is the number of scanlines supplied in the slow scan direction. The ASIC reads in scanlines per page from decompressor chips according to this parameter. The resolution of ISPP is on an 8-scanline basis due to the requirement of JPEG.

5. Active pixels per scanline (APPS): these are the actual non-white valid pixels marked on paper in the fast scan direction. Active pixels are the remaining pixels in the scanline after performing shifting. The resolution of APPS is on pixel basis.

6. Active scanlines per page (ASPP): these are the actual non-white valid scanlines marked on paper in the slow scan direction. Active scanlines are the remaining scanlines in the page after performing shifting. The resolution of ASPP is on scanline basis.

7. Start-of-Page margin (SOP): this is the white scanlines area at the beginning of page. This parameter can be used to shift the image on the page as used in shifting the image over the hole punch area. The resolution of SOP is on a scanline basis.

The process will generate padding strips for the SOP region and at the end of page after active image area. The process begins sending active data to the PE after the last padding strip in the SOP is sent. The process completes sending active data to the PE after the last scanline in the active area per page is sent.

The system expects to deliver active image data strips and trim completely off-page strips at the end of page. If the last strip straddles over the trailing edge of page, the system will deliver active strip data up to Active Scanline per Page count and discard any remaining strips.

The system will generate padding strips at the end of page after the active image area. For performance and real-time operation reasons, the system completely trims off-page strips at the beginning of page and does not send them out. If the first strip sent straddles over the leading edge of the page, the system will discard off-page scanlines according to SOP count and send only the first strip. The system completes sending active scanline data to the PE after the last scanline in the active image area is sent and then fills in the rest of the page with margin strips. At the beginning of each scanline, the system sends the margin (white ink) up to Start of Scan count before sending active scanline data. And at the end of each scanline, the system discards the remaining pixels in the Input pixels scanline after the number of pixels put out reaches the Output Pixels per Scanline count.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of progressive image shifting for use in printing a multi-page document, comprising:

for each document page:
forming page image data into a plurality of independent strips, each of which is a full page in length in a fast scan direction and a number of scan lines in a slow scan direction;
compressing each of the plurality of independent strips, the plurality of compressed independent strips forming a compressed page image;
determining an amount and a location to shift the page image on the page;
shifting the compressed page image by inserting a compressed blank strip corresponding to the amount to shift the page image at the determined location on the page;
adjusting locations of the plurality of compressed independent strips according to the location of the compressed blank strip, the compressed page image and the compressed blank strip forming a shifted compressed page image;
decompressing the shifted compressed page image, and printing the document;
wherein printing the document comprises printing two document pages per each sheet of output media, and further comprising:
for each pair of first and second page images:
determining an amount and location of gutter space to be provided between the first page image and the second page image;
inserting a compressed blank strip corresponding to the determined amount of gutter space at the determined location between the first shifted compressed page image and second shifted compressed page image forming a shifted compressed pair image; and
decompressing the shifted compressed pair image.

* * * * *